Dec. 17, 1940.   E. B. BARNES   2,225,203
HEATING AND VENTILATING MEANS
Filed Sept. 3, 1938   2 Sheets-Sheet 1
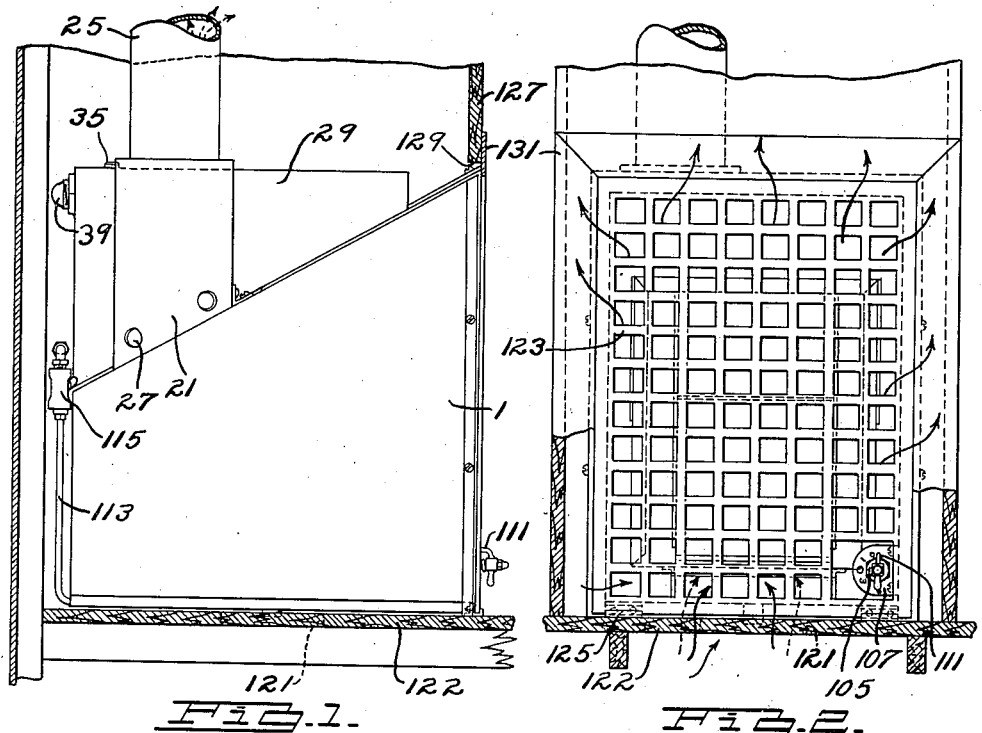
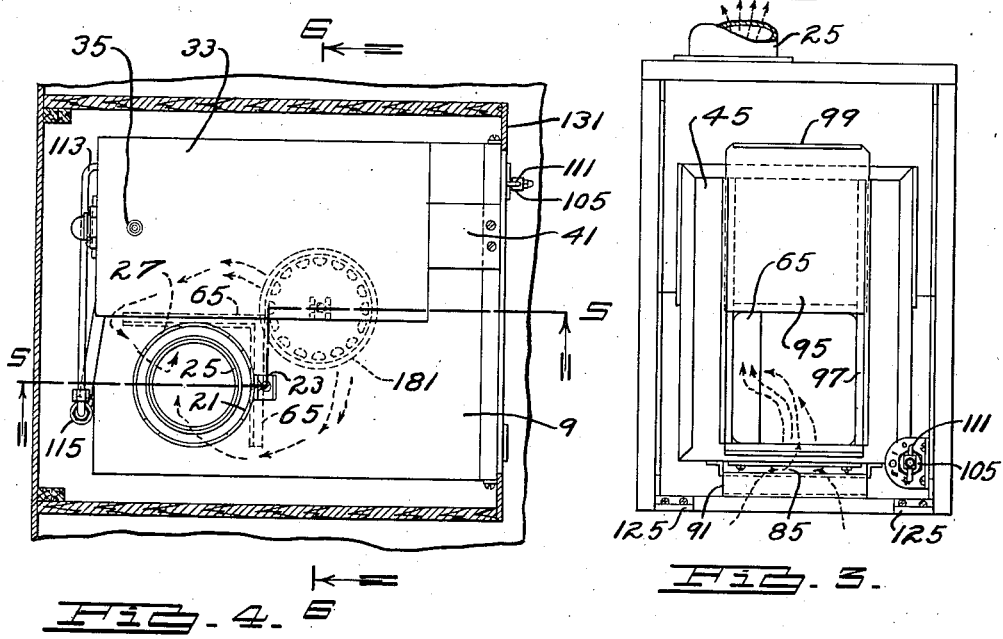
INVENTOR.
Elias B. Barnes
BY
ATTORNEY.

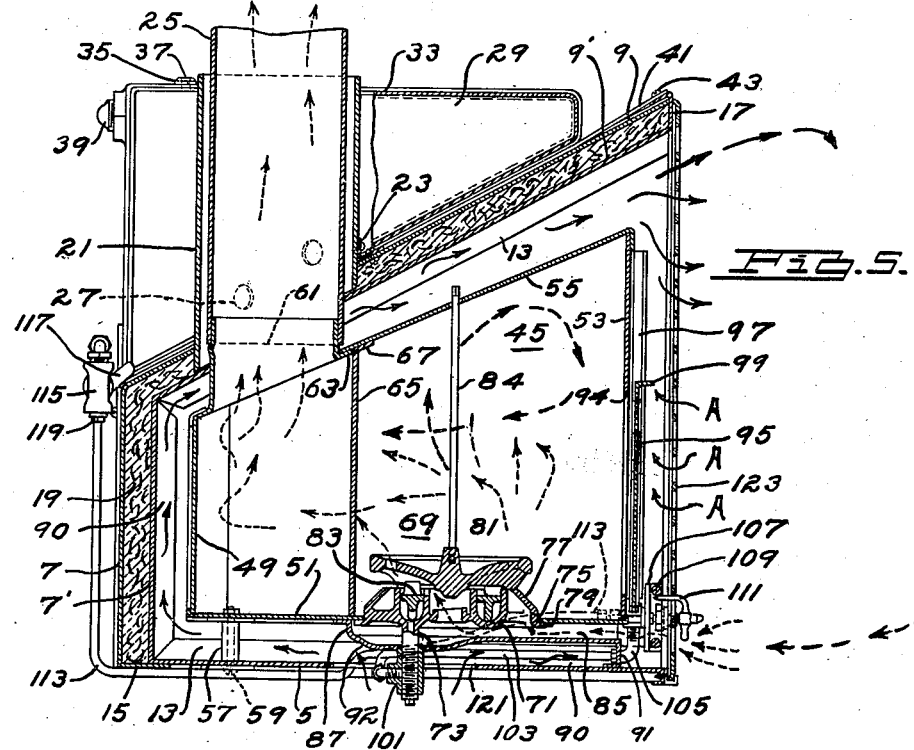
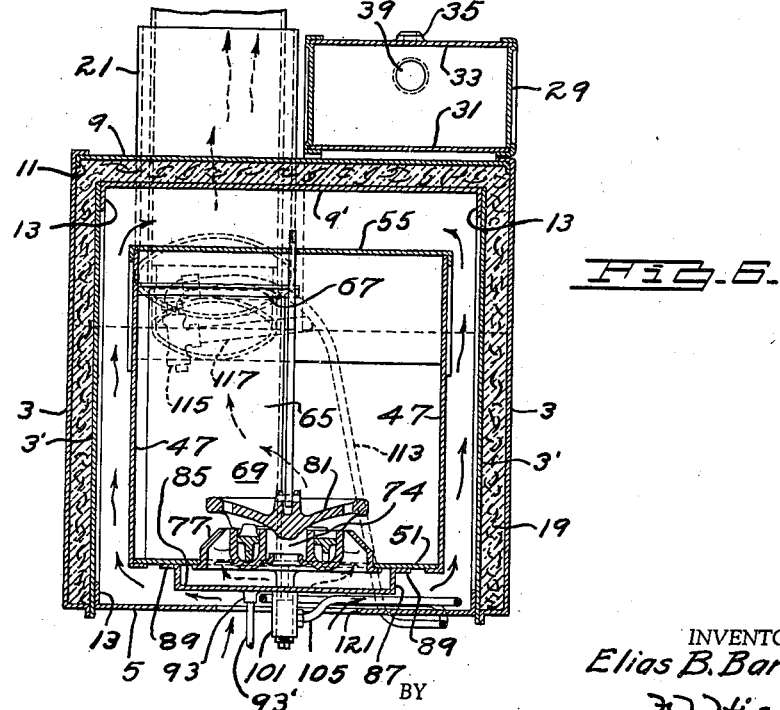

Patented Dec. 17, 1940

2,225,203

UNITED STATES PATENT OFFICE 2,225,203

HEATING AND VENTILATING MEANS

Elias B. Barnes, Sturgis, Mich.

Application September 3, 1938, Serial No. 228,269

3 Claims. (Cl. 126—93)

My invention pertains to an improved method of and unit for heating and ventilating small enclosures, such as trailers, cabins and the like.

In heating small inhabited enclosures, such as trailers and cabins, considerable difficulty has been experienced in heating such enclosures for comfort under a wide range of climatic conditions, in removing the used air and odors, in providing proper circulation of the air for comfort, in properly regulating the humidity to eliminate conditions of excessive humidity which frequently occur, and in providing suitable apparatus for efficiently performing these useful functions which could be sufficiently compact and well insulated so that it could be installed in the lower portions of cabinets and closets, under tables, and in available corners.

It is accordingly an object of my invention to provide an improved method of and means for heating, ventilating and regulating humidity in small enclosures by utilizing the heat of combustion for drawing the used air off from the floor of the enclosure through the burner and stack, discharging it from the combustion chamber with the products of combustion; and by using the heat of combustion to draw in fresh out-door air around the fire-box, heating the fresh out-door air and discharging it laterally into the enclosure near the floor, slightly above the point where the floor air is removed, in order to provide a definite balanced exchange of air in the enclosure, close to the floor, and to provide heat close to the floor for maximum comfort.

It is also an object of my invention to provide an improved system and unit for heating, ventilating and regulating humidity, in trailers, cabins and small enclosures, which will be thermally efficient, compact and well insulated for convenient installation in the lower portions of cabinets, in corners and under tables, which will operate to effectively provide heat at the floor first, to remove used air from the floor and to replace the removed air with an equal intake of fresh out-door air heated and circulated throughout the room, thus preventing excessive humidity and wall sweating, and which in addition to providing positive air exchange will also re-circulate and re-heat the room air.

It is a further object of my invention to provide such a heating and ventilating unit comprising an insulating housing open at one side, the top wall of the housing sloping downwardly toward the back of the housing, an open grill, means for removably supporting the grill on the open side of the insulating housing, a combustion chamber within the housing and of a substantially similar conformation, means for mounting said combustion chamber in the insulating housing in substantially spaced relation from the walls thereof, an aperture opening through the bottom wall of the combustion chamber, a floor air inlet conduit connecting from the outlet aperture and extending through the space under the combustion chamber and opening toward the open side of the insulating housing for drawing air off of the floor of any enclosure to be heated by the unit in segregated relation from the outside fresh air coming into the unit, a fluid fuel burner mounted in the combustion chamber, a stack connection for discharging combustion products from the combustion chamber, and a ventilating aperture opening through the bottom of the en osing housing to admit fresh outside air segregated from the outgoing floor air for rising around the hot combustion chamber and between the spaced apart sloping top walls of the housing and the combustion chamber for discharging laterally from the open side of the housing to provide a definite balanced exchange of air adjacent the floor for ventilation and to provide heat at the floor for maximum comfort.

Further objects and advantages are within the scope of my invention, such as relate to the arrangement, operation and function of the parts of the structure, to various details of construction, to combinations of parts, and to economies of manufacture and numerous other features as will be apparent from a consideration of the specification in conjunction with the drawings disclosing one specific form of my invention, in which:

Fig. 1 is a side elevational view showing my improved heating and ventilating unit as it is installed for use in heating a trailer or other small enclosure;

Fig. 2 is a front elevational view showing the front of the installed unit;

Fig. 3 is a similar view, to a reduced scale, showing the front of the unit with the grille removed as for lighting the burner;

Fig. 4 is a plan view of the installed heater unit;

Fig. 5 is vertical sectional view taken longitudinally through the unit as shown by line 5—5 in Fig. 4; and Fig. 6 is a transverse sectional view taken on line 6—6 thereof.

Referring more particularly to the drawings, it will be seen that my improved heating and ventilating unit comprises an outer housing 1, comprising side walls 3, a bottom wall 5, a back wall 7, an open front and a sloping top wall 9 which inclines downwardly from the front to the back of the unit. The back wall 7 and top wall 9 may be made of a single piece of sheet metal, as shown, having inturned peripheral flanges 11 for receiving the edges of the side walls, which may be secured thereto in any suitable manner as by spot welding or riveting.

The housing is an insulated double wall construction, as may be seen in Figs. 5 and 6, comprising a back liner 7' spaced inwardly from the back wall 7 and a top liner 9' spaced under the sloping top wall 9. The housing may be made of any suitable sheet metal, such as galvanized sheet iron, or the like. The top liner 9' and back liner 7' may be conveniently made integral with the bottom wall 5 of the housing, as shown, and by providing inturned flaps 13 along the side edges, side liners 3' are also conveniently secured thereto in any suitable manner, to make an insulated side wall construction. The space between the back wall 7 and its liner 7' may be closed at the bottom by means of a flap 15 turned under and secured to the under side of the bottom wall 5, as shown.

A suitable flange or frame 17 is provided to cover and close the insulation space, between the double walls at the front of the housing, where it is secured to the front edges of the walls of the housing, as shown in Fig. 5. The insulation space between the double walls of the housing, is packed with any suitable insulation material 19 to provide good thermal insulation in order that the unit may be installed in cabinets, closets, and under tables and in convenient corners without danger of igniting combustible materials. For packing the space between the double walls of the housing, any good thermal oven insulation may be utilized, such as high quality rock wool, glass wool, or the like. This insulation also prevents heat escaping by passing through the walls of the housing and more effectively forces the moving heated air to flow upward and outward over the hot combustion chamber and through the open front of the housing close to the floor.

On the back portion of the top wall of the housing I provide a tubular stack conduit 21 of sheet metal, which is secured in place by an angular piece 23, and passes vertically therethrough to a point adjacent the top liner 9' for passing a smoke stack 25 into the housing. The stack conduit 21 is preferably provided with ventilating holes 27 which admit air to circulate around the smoke stack. The smoke stack and conduit project from the top wall of the housing at one side, as shown in Fig. 4, and adjacent thereto a fuel tank 29 is mounted.

The fuel tank may be of any suitable sheet metal construction, the top wall 33 being substantially parallel with the bottom wall 5 of the housing to make a complete assembly having a generally compact rectangular shape. The top wall of the fuel tank is provided with a gauge fixture 35 having an aperture 37 through which a small rod may be inserted into the tank in order to measure its fuel content. The aperture 37 in the gauge fixture is threaded for receiving a plug. A removable plug 39 in the back of the fuel tank allows a pipe to be inserted for filling the fuel tank. A bracket strap 41 is soldered to the bottom of the fuel tank 29 extending flush on the sloping upper wall 9 of the housing for attachment thereto as by a screw 43. The lower end of the fuel tank may also be similarly secured on the housing.

A sheet metal combustion chamber 45 is provided which is of a shape generally similar to the shape of the insulated housing, but of a smaller size, comprising side walls 47, a back wall 49, bottom wall 51, front wall 53 and a sloping top wall 55. The combustion chamber 45 is mounted on suitable mounting means rising from the bottom of the housing and comprising a tubular spacer 57 for spacing the bottom 51 of the combustion chamber from the bottom 5 of the housing to permit air to circulate freely between. A bolt 59 passes through the spaced bottoms 51 and 5 of the chamber and the housing and concentrically through the spacer tube for clamping the connected parts firmly together in predetermined spaced positions. Any member of spacers 57 may be provided in properly spaced positions for firmly supporting the combustion chamber in its proper position.

The combustion chamber 45 is preferably made of the best sheet steel stove material, and it may be constructed in any suitable manner as by bending the edges of the separate walls to provide flanges for overlapping the next adjacent wall to which attachment may be made as by welding or riveting, as will be understood. Preferably the combustion chamber and the enclosing housing have cross-sections of square or other rectangular conformations in horizontal planes, as shown.

Extending through the top wall 55 of the combustion chamber adjacent one of the rear corners, I provide a smoke pipe nipple 61 having a laterally projecting flange 63 at the lower end for abutting the under side of the top wall to which it is secured. The upper end of the pipe nipple 61 projects into the lower end of the stack conduit 21 for receiving the lower end of the stack or smoke pipe 25 which extends outside of the enclosure to be heated for discharging the products of combustion and the used air therefrom.

A baffle plate 65, is secured to the top wall of the combustion chamber, as by a laterally bent abutting flange 67, as shown in Figs. 5 and 6. As also shown by dotted lines in Fig. 4, the baffle 65 is bent to a two-sided conformation and it is disposed in a rear corner adjacent the pipe nipple outlet and slightly spaced from the side walls of the chamber.

For heating the combustion chamber of my heating and ventilating unit, I provide any suitable liquid or gas fuel burning burner which is mounted therein. For this purpose I preferably utilize an indestructible surface type of oil-burner 69 of a well known wickless make, as shown in Figs. 5 and 6. Such a burner comprises an annular oil-well 71 in which the fuel oil is received through a pipe fitting 73 connecting into the bottom of the well and having a central air passage 74.

For receiving the burner and passing air, the bottom wall of the combustion chamber is provided with a floor air receiving port 75, and the downwardly diverging circular flange 77 of the burner extends upwardly therethrough with its large outer annular flange 79 abutting under the edge of the port 75 to which it is secured in any suitable manner, as by a bolt or screw. The wickless oil burner, which is of a well known construction, comprises an apertured top disk or flame spreader 81, and also a burner ring 83 of annular conformation which normally rests in the annular oil well for vaporizing the oil and maintaining combustion as the oil enters the well. A cleaner rod 84 connects from the center of the flame spreader 81, extending upwardly through the top wall of the chamber where its upper end is squared to receive a wrench for turning the disk to conveniently clean the burner.

A conduit 85 connects from under the aperture 75 in the bottom wall 51 of the combustion chamber, and extends along the under side of the bottom wall 51, as shown in Figs. 5 and 6, opening adjacent the open side of the housing for drawing used air into the combustion chamber from the floor of the enclosure to be heated. The floor air inlet conduit 85 is formed by means of a piece of sheet metal closed around the back and sides by means of turned up marginal walls 87 having lateral flanges 89 abutting the under side of the bottom wall of the combustion chamber to which they are secured in any suitable manner as by welding or riveting. The floor air conduit 85 is spaced above the bottom wall 5 of the housing and is provided with a down turned lip 91 at its open front end which partly closes the front end of the bottom air circulating space 90. At the inner end the bottom of the floor air conduit 85 is apertured to pass the pipe fitting 73 from the burner. Also the bottom of the sheet metal conduit 85 is bulged downwardly to form a catch basin 92 for catching any oil drip from the burner, which is drained off through a pipe fitting 93 brazed therein to receive a drain pipe 93'. The floor air inlet conduit 85 draws the foul air from the floor of the room into the heater in segregated relation from the fresh outside air which comes up into the heater through the single aperture 121.

To provide convenient access for lighting the burner, and also for cleaning the chamber and the burner, I provide a large opening 94 in the front wall 53 of the combustion chamber, as shown in Figs. 3 and 5. This opening is normally covered by means of a sliding closure 95 which slides up and down between a pair of guide channels 97 secured to the front wall of the chamber in any suitable manner. The upper end of the sliding closure 95 is turned outwardly to provide a ledge 99 which serves as a convenient handhold. After the burner has been ignited, the closure 95 drops down and closes the opening in the front of the combustion chamber.

As shown in Fig. 5, the lower end of the pipe fitting of the burner is threaded for joining through any suitable connection 101 with one end of an oil line 103 the other end of which is connected to a fuel controlling valve 105 which is mounted in the open front of the housing on a bracket 107 secured by screws 109 to one of the side liners of the housing. The fuel controlling valve 105 is a hand controlled brass valve of a metering pin type which provides a constant rate of fuel feed for any predetermined setting. The handle of the valve is provided with a pointer 111 which moves over numerals provided on the bracket plate 107 forming a dial to indicate the adjustment of the fuel setting, which facilitates providing the exact amount of heat required.

From the metering valve 105, a fuel line 113 extends to the rear of the unit, where it connects into the upper branch of a T fitting 115. From the stem of the T a large pipe 117 is connected, as by soldering, into the lower corner of the fuel tank 29 from which all the fuel may be drawn because of the sloping position of the bottom of the tank. A plug 119 is threaded into the lower branch of the T which is conveniently utilized as a sediment collecting bulb or sump.

Through the bottom wall of the housing a single ventilating aperture 121 is provided for admitting fresh outside air into the spaces under and surrounding the combustion chamber to efficiently receive heat therefrom. When the heater ventilating unit is installed in a trailer, or a cabin, a corresponding single ventilating aperture 121' is cut in the floor 122, as shown in Figs. 1 and 2, for admitting fresh outside air.

Over the open front side of the housing a grille 123, of any suitable open work construction is installed to prevent accidental contact with the hot combustion chamber while permitting the air to flow freely therethrough. Also an attractive screen gives a finished appearance to the unit. As shown in Fig. 5, hinge brackets 125 project from the bottom of the front side of the unit for securing the lower edge of the grille 123 which seats therein. To install the unit concealed in a closet or cabinet, the front wall 127 is cut to provide an aperture 129 sufficient to receive the front side of the unit, as shown in Fig. 1, and by applying a suitable breaker strip or molding 131 a neat concealed installation is conveniently provided. Any suitable fastening means or fixture may be installed on the molding for releasably securing the grille 123.

In operation the fuel tank 29 is filled with a suitable fuel for which purpose kerosene or No. 1 fuel oil has proven satisfactory. The metering valve 105 is next opened and adjusted by setting the indicator 111 on the proper number on the dial to furnish the quantity of heat desired. The grille 123 is then pulled forward, the slide 95 is lifted, and by applying a match the oil in the burner is conveniently ignited. The slide and the grille are closed and the unit is ready for heating and ventilating the room.

As represented in Fig. 5, the heat from the combustion chamber causes the air to circulate and flow for heating and ventilating the enclosure. As indicated by the dotted arrows shown in Fig. 5, this causes a stream of used air to flow from the floor of the room into the floor air inlet duct 85 just above the floor and under the combustion chamber 45, whence the air rises through the burner into the combustion chamber, thus removing the cold air and impurities from the floor of the trailer or cabin and also supplying air for combustion. The hot gases from the burner circulate in and around the higher levels of the combustion chamber as represented by the dotted arrows, for heating the side walls, and then passing around the baffle plate 65 are drawn out through the stack 25 which rises vertically for discharging the products of combustion and the impure used air from the room. When the hot combustion gases rise and circulate in the higher portions of the combustion chamber, the heat is effectively transmitted to the side walls thereof before going into the stack 25, thereby providing for a cool stack and improving the thermal efficiency of the heater unit.

At the same time pure fresh air for heating and ventilating is drawn from outside into the space 90 under the combustion chamber where the heat causes it to spread and rise around the walls of the combustion chamber as shown by the arrows in full lines in Figs. 5 and 6, to carry heat therefrom and to be discharged laterally into the room from the open side of housing. This air stream is shown by full line arrows. The sloping top walls of the housing and the combustion chamber provide an upwardly sloping space or chute which causes the rising hot air to move with considerable and increasing velocity and to be discharged laterally with considerable velocity so that heat is provided first adjacent the floor, and also the air is agitated or circulated for maximum comfort. Also because the stream of hot air is discharged into the room near the floor, and at a position just above the point where the cold used air and impurities are removed, the natural tendency of the hot air to rise is to some extent neutralized because of its high component of horizontal velocity and it also tends to replace the air which is at the same time drawn off the floor. In this manner heat is provided adjacent the floor where it is needed. In addition to providing the desired temperature control in trailer cabins and small enclosures, the improved heating and ventilating unit provides a positive exchange of floor air for warmed and circulated fresh air which creates air circulation, definitely removes air impurities and prevents wall sweating in the trailer and the formation of the conditions of extreme humidity which are so often prevalent. Also floor air in the room is recirculated and heated as indicated by arrows A in Fig. 5.

As the size over-all for a heater to heat trailers and small compartments may be only 14 inches wide, by 18 inches high, by 17 inches from front to back, and as the unit is well insulated with the best quality rock wool insulation installation may be conveniently made in the bottom 18 inches of a wardrobe or cabinet. Also my improved heater unit may be installed as a replacement unit in the stove space usually provided beside the door of the trailer. A small compact well insulated unit of this size has proven satisfactory and economical for heating, ventilating and regulating the humidity in a 17 foot trailer under all varying climatic extremes that are usually prevalent in the United States during the winter months while using only a small quantity of cheap fuel oil.

It is apparent that within the scope of the invention, modifications and different arrangements may be made other than herein disclosed, and the present disclosure is illustrative merely, the invention comprehending all variations thereof.

I claim:

1. In combination in a heating and ventilating unit for small enclosures, an insulating housing open at the front side, the top wall of said housing sloping downwardly toward the back of the housing, an open grill, means for removably supporting said grill on the open side of the insulating housing, a combustion chamber of smaller size than the housing, means for mounting said combustion chamber in said insulating housing in spaced relation from the walls thereof, a floor air inlet aperture opening through the bottom wall of the combustion chamber, a floor air inlet conduit connecting from said aperture and extending through the space under the combustion chamber and opening toward the open front side of the insulating housing for drawing air off of the floor of an enclosure to be heated by the unit, an oil fuel burner mounted in said combustion chamber, a stack connection opening from the lower part of the sloping top wall for discharging combustion products from the combustion chamber, a movable closure on said chamber to provide access to said burner and to the interior of said combustion chamber, and a ventilating aperture opening through the bottom of the enclosing housing to admit fresh outside air under the combustion chamber for rising around the hot combustion chamber and between the spaced apart sloping top walls of the housing and the combustion chamber for discharging laterally from the open side of the housing with an appreciable horizontal velocity component to provide a definite balanced exchange of air adjacent the floor for ventilation and to provide heat adjacent the floor for maximum comfort.

2. In combination in a heating and ventilating unit for small enclosures, an insulating housing of substantially regular cross sections open at one side, a combustion chamber of smaller size than the housing and of a substantially similar conformation, means for mounting said combustion chamber in said insulating housing with the walls in substantially parallel spaced relation, a floor air aperture opening through the bottom wall of the combustion chamber, a floor air conduit connecting from said floor air aperture and extending through the space under the combustion chamber and opening toward the open side of the insulating housing for drawing air off of the floor of an enclosure to be heated by the unit, an oil burner mounted in said combustion chamber, a stack connection for discharging combustion products from the combustion chamber and drawing only floor air therein, a movable closure on said chamber to provide access to said burner, and a ventilating aperture opening through the bottom of the enclosing housing under said combustion chamber to admit fresh outside air for rising around the hot combustion chamber in segregated relation from the foul floor air and discharging from the open side of the housing to provide a definite balanced exchange of air adjacent the floor for ventilation and to provide heat adjacent the floor for maximum comfort.

3. In combination in a heating and ventilating unit for small enclosures, a combustion chamber, an opening in the front wall of said chamber, a closure member movably disposed over the opening in the combustion chamber, an insulating housing enclosing said combustion chamber in spaced relation and being open on the front side, means mounting the combustion chamber in spaced relation above the bottom wall of the enclosing housing, a stack connection opening from the combustion chamber, a floor air aperture opening through the bottom wall of the combustion chamber, a burner mounted in said combustion chamber for exposure in the air stream flowing through the floor air aperture, a floor air conduit connecting from said floor air aperture in the combustion chamber to the open front of said housing to draw air off of the floor of any enclosure to be heated by the unit, and a ventilating aperture opening through the bottom of the enclosing housing to admit fresh outside air for rising around the hot combustion chamber in segregated relation from the floor air in said conduit and discharging from the open side of the enclosing housing while only floor air is drawn through the combustion chamber to provide a definite balanced exchange of air for heating and ventilating.

ELIAS B. BARNES.